July 17, 1956  E. P. McCREERY  2,754,827
CORN SHELLER AND SEPARATOR
Filed Sept. 22, 1953  5 Sheets-Sheet 1

INVENTOR.
EDWARD P. McCREERY
BY
Oberlin + Limbach
ATTORNEYS.

INVENTOR.
EDWARD P. McCREERY
BY
Oberlin + Limbach
ATTORNEYS.

July 17, 1956  E. P. McCREERY  2,754,827
CORN SHELLER AND SEPARATOR
Filed Sept. 22, 1953  5 Sheets-Sheet 4

INVENTOR.
EDWARD P. McCREERY
BY
Oberlin + Limbach
ATTORNEYS.

United States Patent Office 2,754,827
Patented July 17, 1956

2,754,827

CORN SHELLER AND SEPARATOR

Edward P. McCreery, Lakewood, Ohio, assignor to The C. O. Bartlett & Snow Company, Cleveland, Ohio, a corporation of Ohio Application September 22, 1953, Serial No. 381,558

18 Claims. (Cl. 130—6)

This invention relates to corn shellers and more particularly to an improved type of corn sheller which combines increased shelling capacity with efficient corn separation from the cobs and husks.

Corn shellers generally are composed of an outside cylindrical screen which confines the ears of corn being shelled and an axially supported rotating member having teeth which beat upon the ears. The rotating members have been made in a variety of ways which include: (1) a cylinder to which radially projecting teeth have been attached; and (2) a spider arrangement which carries a series of longitudinal bars at their periphery to which in turn are affixed a plurality of teeth. The cylindrical screens have also been made in a variety of ways which include: (1) a cylinder made from stout wire screening; (2) a cylinder made from rods or bars closely spaced; and (3) a cylinder made from steel plate and containing perforations along its bottom portion for allowing the kernels to escape. In all of the above types of machines, however, the clearance between the periphery of the rotating tooth supporting member and the inside of the screen cylinder have been in the order of three to four inches and as an example is 3¼" in a machine now enjoying wide commercial usage.

Machines have been made according to the above principles since the founding of our country and no important changes have been made in them since the turn of the century. Since that time several notable changes have taken place. Whereas corn shelling was originally done at the farm and the products used by the farmer himself, the bulk of today's corn shelling is done in central locations such as grain elevators—the cobs and husks usually being burned. The demand has been, therefore, for larger capacity machines and for machines which would extract a greater percentage of the corn kernels. This is now being done at grain elevators in two separate machines— one for shelling the corn and a second for removing the corn from the cobs and husks. The machines used for separating the corn from the cobs and husks are large expensive machines usually employing a large slowly revolving cylindrical screen or large shaking screens having enough surface so that the material is spread out in a fairly thin layer.

A second problem has arisen in recent times with the use of mechanical corn pickers. These machines do not remove the husks to any appreciable degree so that a much larger amount of husk material is fed to the shelling and screening machines. This material tends to accumulate in a layer on the separating surfaces of both shellers and separators and keeps the kernels of corn from passing through the screening surfaces.

It is therefore an object of my invention to produce a simple, durable machine which will have increased shelling capacity and which at the same time can perform both the shelling and separating functions, having in mind a design most suitable for permanent installation in shelling plants such as grain elevators. Correspondingly, therefore, I have made two significant changes in the design of corn shellers: (1) I have increased the annular clearance between the central rotating member and the cylindrical screen from 3¼" to 5", and (2) I have employed a cylindrical screen made of steel plate containing perforations over the entire circumferential extent of the cylinder. I found that the capacity of the new machine was 35 to 45 tons of ear corn per hour, while the capacity of the former commercial model had been only 10 to 15 tons of ear corn per hour, both machines being operated at the same R. P. M. Studying the action of the ears in the new machine, I have found that the 5" clearance between rotor and screen allowed more ears to be rubbed against each other and that the unexpected capacity was due principally to this increased rubbing action between the ears. It appears that almost all of the kernels are removed from the cobs in the first three feet of the machine and that only 60–70% of the kernels are screened from the husks and cobs in this same distance. By providing an additional portion containing the same large clearance and having a screening surface over its entire circumferential area, approximately 99% of the kernels can be separated from the cobs and husks. I further find that the entire mass is under centrifugal action and that holes around the entire circumferential area are necessary to remove the kernels fast enough to effect a thorough separation from the cobs and husks.

Correspondingly, I have designed an improved machine as shown in the attached drawing.

To the accomplishment of the foregoing and related ends, said invention, then, comprises the features hereinafter fully described and particularly pointed out in the claims, the following description and the annexed drawing setting forth in detail certain illustrative embodiments of the invention, these being indicative, however, of but a few for the various ways in which the principle of the invention may be employed.

Figure 2:
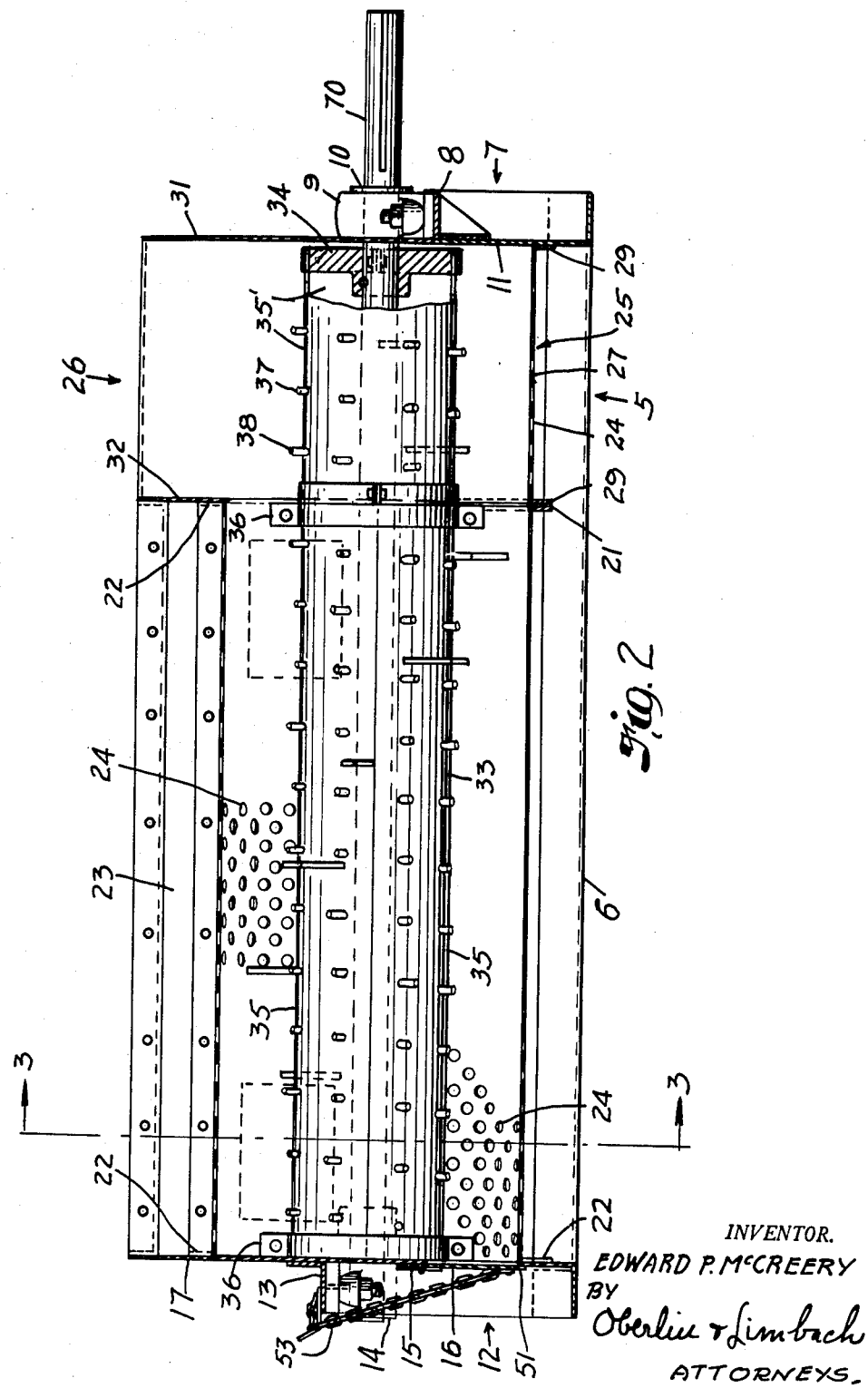
Fig. 2 is a vertical longitudinal section through the center of the machine.
Figure 3:
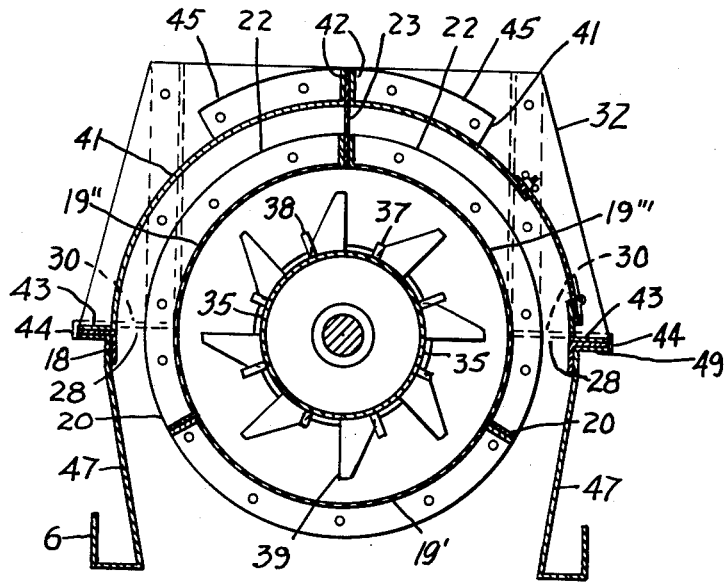
Fig. 3 is a vertical cross-section of the machine looking toward the feed end.
Figure 4:
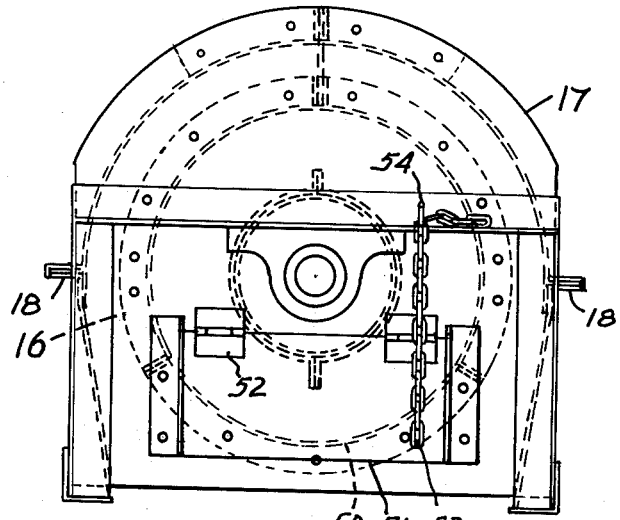
Fig. 4 is an elevation of the discharge end of the machine showing the cob discharge door.

Referring now to Figs. 2, 3 and 4, numeral 5 represents a frame composed of two longitudinal base angles 6 held apart on one end by an end frame 7 which extends up to the horizontal center line of the machine. End frame 7 contains a horizontal member 8 for mounting pillow block 9 containing a bearing 10, such that the center line of the bearing coincides with the top of the frame. A plate 11 is welded to the inside surface of the end frame 7 so as to close off this end of the machine. Base angles 6 are held apart on the other end by end frame 12 whose topmost member 13 lies above the horizontal axis of the machine, a distance such that the bearing 14 in pillow block 15 is positioned on the center line of the machine. The inside surface of this frame is likewise closed off by a plate 16 welded to the frame. Plate 16, however, has a semi-circular portion 17 which extends above the frame to close off the entire end of the machine and to provide support as will later be described. Between plates 11 and 16 are a pair of angles 18, the top faces of which are on the horizontal center line of the machine.

The cylindrical screen for this machine is 20" I. D. and is made up in three identical 120° sections 19', 19"

and 19''' each having a pair of radial flanges 20, one on each side of the section. Each section also has a pair of plate flanges 22, one of which is welded to each end of the section. The three sections are positioned so as to produce a cylinder and are bolted to each other by means of their flanges 20. Between the flanges 20 between sections 19'' and 19''' is bolted a plate 23 as shown in Fig. 3. Flanges 22 on the rear end of sections 19', 19'' and 19''' are bolted to the plate composed of portions 16 and 17 and the flanges on the forward end of the sections will be secured as described later. All three sections 19', 19'' and 19''' have holes 24 through the plate and spaced evenly over its entire inside surface excepting the border areas near the flanges 20 and the ends of the sections.

The section of the screen 25 which is positioned under the receiving hopper 26 is made up of a 180° section of a cylindrical plate 27 rolled to the same radius as sections 19', 19'' and 19'''. The plate 27 is perforated with holes 24 in a manner similar to sections 19', 19'' and 19'''. Plate 27 has a pair of flanges 28 one on either side which rest on top of angles 18. At either end of plate 27 is one of a pair of semi-circular flanges 29, one of which bolts to spacer 21 and section 19' and the other bolts to plate 11 as shown in Fig. 2.

Receiving hopper 26 is made up of two sides having flanges 30 which rest on top of flanges 28 and are bolted with flanges 28 to angles 18. The front face of the box 31 extends below the top of plate 11, excepting in the area behind the pillow block, thereby closing off the front end of the machine. The back plate 32 of the hopper has a semi-circular segment removed along its bottom edge to correspond with the radius of the sections 19'' and 19'''. This plate 32 also establishes a support to which flanges 22 of sections 19'' and 19''' are bolted.

The shelling rotor 33 is 10'' in diameter and contains a shaft 70 which is rotatably secured in bearings 10 and 14. This rotor is made up of four sections of semi-cylindrical plate such that two sections 35 are positioned between the feed hopper and the end of the machine and that two shorter sections 35' are positioned underneath the feed hopper. These sections are positioned by suitable hubs 34 attached to shaft 70 and are held in place by clamps 36. Welded to these half cylinders are two sets of teeth or fingers arranged in a helical pattern, a first set made up of shorter teeth 37 (sixty-three in number) which are in the order of ½'' to 1'' in length and preferably ¾'' long and a second set of longer teeth 38 (twenty-seven in number) which are in the order of 1'' to 3'' in length and preferably 1½''. These teeth are spaced 4'' apart in longitudinal rows and there are a total of eight rows. Using the feed end of the rotor as a reference plane each succeeding longitudinal row of teeth begins ½'' further away from this reference plane such that a first helix having a pitch of 4'' is defined by connecting the radially adjacent teeth in each of the longitudinal rows. The longer teeth 38 take the positions in the helical pattern of teeth which are 405° apart such that these longer teeth define a second helix having a pitch eight times that of the first helix.

In addition to these two sets of teeth, a set of eight shelling lugs 39 which are formed from ½'' plate and are approximately 3½'' long are spaced evenly over the length of the rotor in a helical pattern of 360°. The functions of teeth 37, 38 and shelling lugs 39 will be described later.

The closure for the machine is accomplished by a hood section above the horizontal center line of the machine and by skirt plates below the center line. The hood is formed by two identical sections 40, each of which is formed from a quarter section of a cylindrical plate 41. The top edge of each plate has a radially extending flange 42. The lower edge of each plate has a radially extending flange 43. The outer edge of the flange 43 is bent downwardly at 90° as at 44 to form a positioning edge to aid in assembly. A pair of segmental circular flanges 45 are positioned at either end of plate 41 adjacent to flange 42 such that the outside face of the flange 45 extends radially from the edge surface of plate 41. Both sections 40 are installed by placing flanges 43 on angles 18 holding the projections 44 against the outwardly extending legs of the angles. Flanges 42 are allowed to rest against opposite sides of plate 23 and are bolted to it while flanges 43 are bolted to their respective angles 18. The segmental circular flanges 45 which are now adjacent to the receiving hopper 26 are bolted to plate 32 while the flanges 45 adjacent to the rear frame of the machine are bolted to plate 17. A pair of hinged doors 46 are mounted in each hood section for inspection purposes. Skirt plates 47 are for either side of the machine and are formed from rectangular plates 48 having flanges 49 on their upper edges. Flanges 49 are bolted to the bottom edge of the horizontal legs of angles 18 while the lower edges bear against the inside edges of angles 6 and their front and rear edges extend adjacent to plates 11 and 16 respectively.

Fig. 4 is a rear view of the machine before installation. A semi-circular hole 50 is cut in plate 16 and a rectangular plate 51 is hinged over the opening. Hinges 52 are attached to plate 16 and the plate 51 along its top edge. One end of a chain 53 is fastened to the bottom portion of the plate and the plate is held open by slipping the appropriate link of chain 53 around a peg 54 which is welded to member 13. The purpose of this mechanism is to regulate the discharge of the corn cobs.

Figure 1:
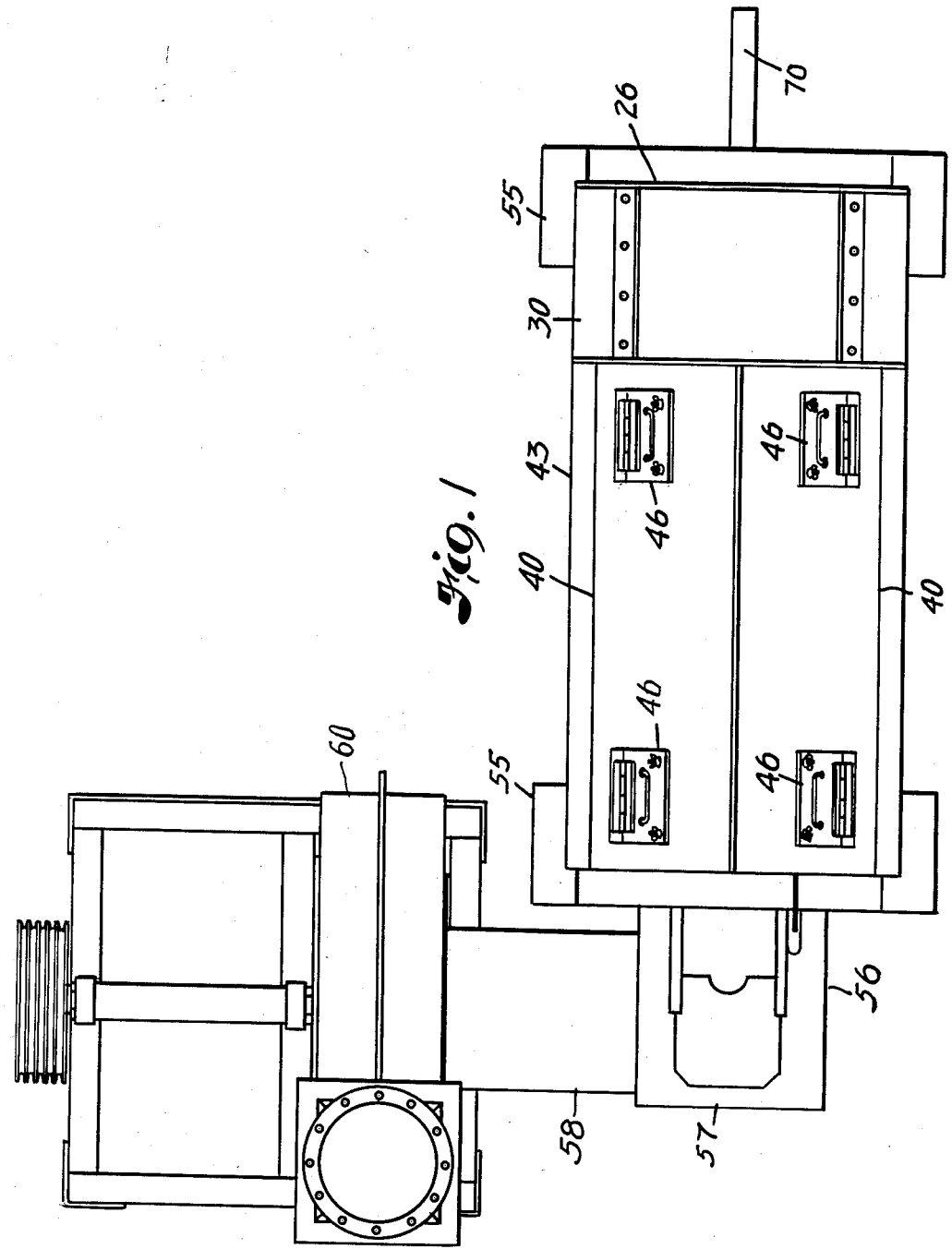
Fig. 1 is a plan view showing a preferred arrangement of the corn sheller, a stone separator and cob blower.
Figure 5:
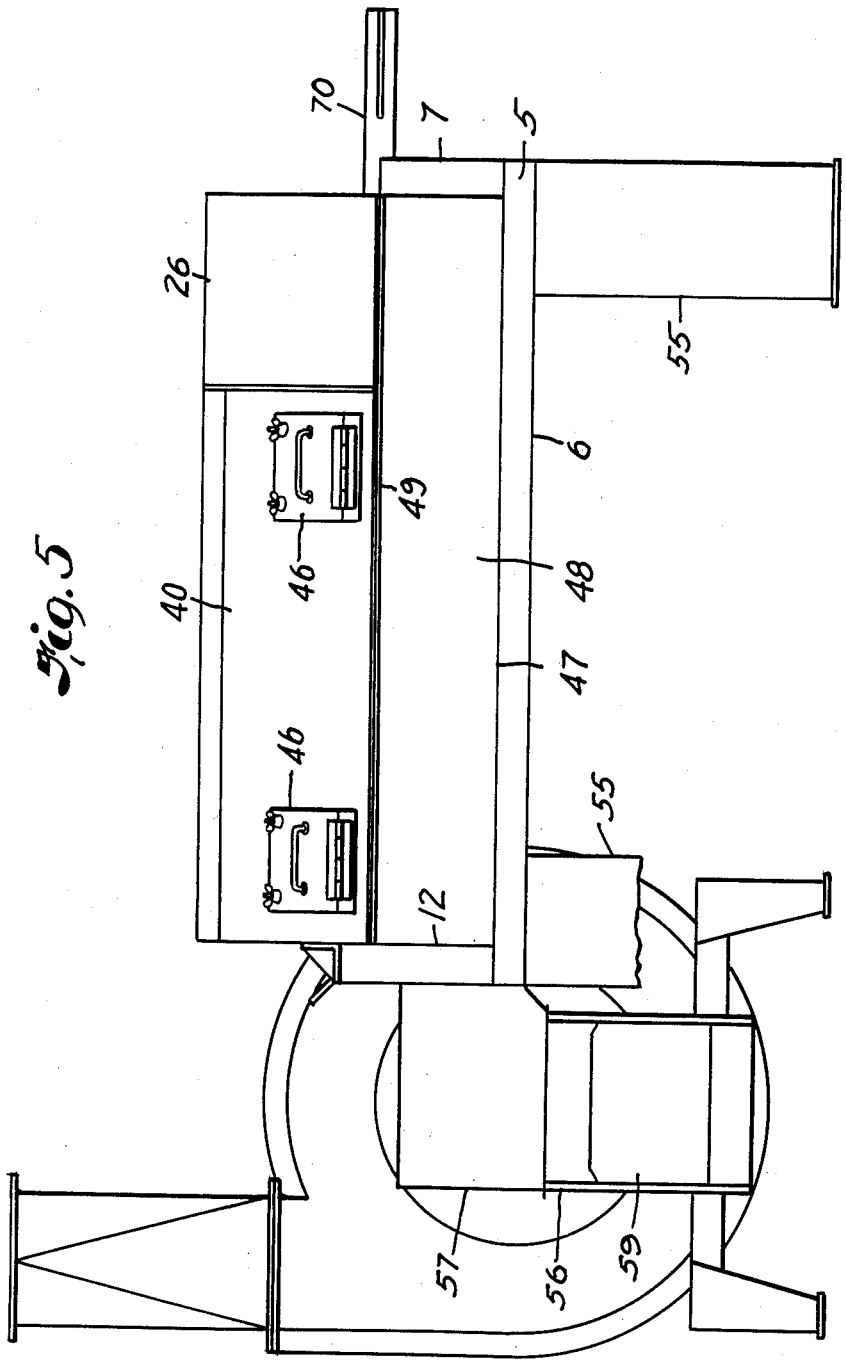
Fig. 5 is a side elevation of the preferred installation arrangement.
Figure 6:
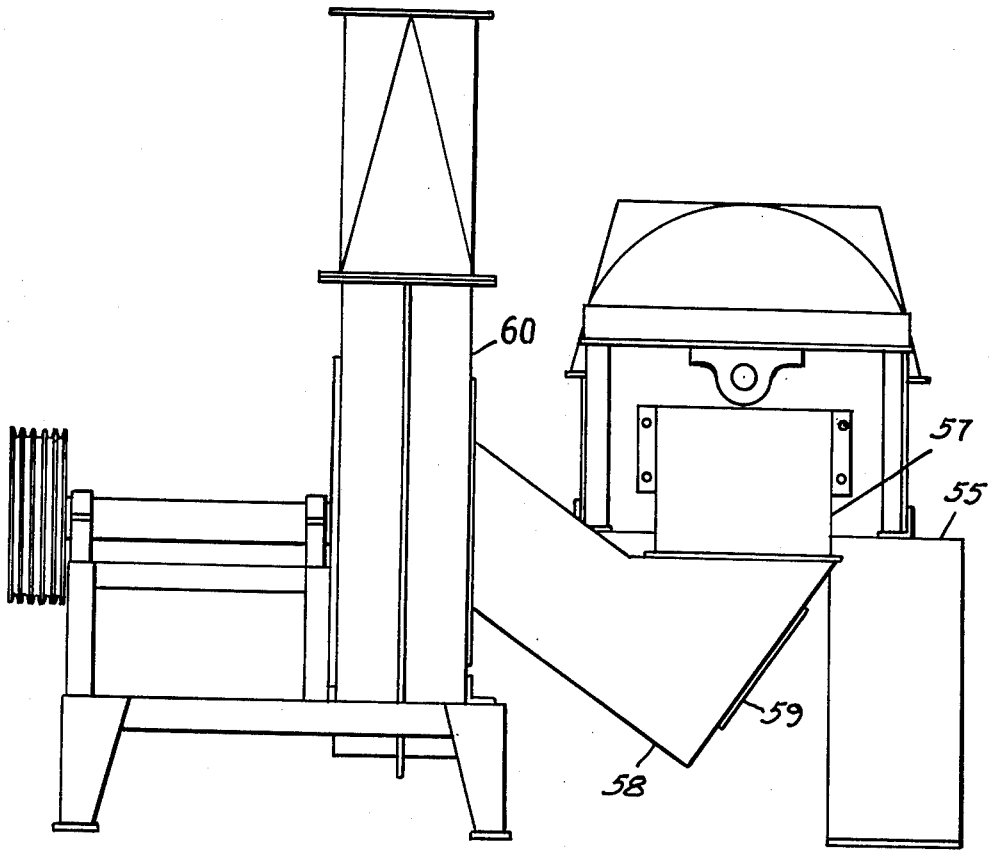
Fig. 6 is an end elevation of the preferred installation arrangement.

A preferred installation arrangement for this machine is shown in Figs. 1, 5 and 6. The frame is supported by suitable piers 55 and a cob and husk chute 56 is attached to the discharge end of the machine. This chute is composed of a rectangular box section 57 which is open on the bottom. One end of an upstanding V-shaped enclosure 58 is fastened to the bottom of box 57. An air adjustment door 59 is installed in the inclined face of the duct directly below the box section 57. The other end of the V-shaped enclosure is fastened to a cob blower 60. This arrangement allows rocks and other heavy materials to be separated from the husks and cobs as will later be described.

The operation of this machine will now be taken up and described in detail. Ears of corn are fed to receiving hopper 26 such that the machine is full at all times. It will be noted from the relative dimensions of the cylindrical screen 19 and the rotor 33 that a space of five inches exists between the two.

Since an ear of corn varies from approximately 2'' to a maximum of 2½'' in diameter, the corn is revolved in essentially two layers with the inside layer receiving the rotary motion from the rotor and imparting it to the outside layer. This condition is conducive to producing a rubbing action of the center layer upon the outside layer and also between the ears in each layer. This rubbing action is so effective that practically all of the kernels of corn are removed from the cobs in the first three feet of the machine, and approximately 70% of the kernels are thrown out of the cylinder in this same section. The remaining portion of the machine is devoted to separating the kernels from the mass of revolving husks and cobs. The machine can therefore be thought of as containing a first shelling section followed by a second kernel separating section.

The rotor of this machine has been designed to revolve the whole mass of ears, etc., with a maximum of agitation among the materials, and it has been further designed to produce a tendency toward individual movements of the ear, as will be described. It will be remembered that two sets of teeth 37 and 38 and a set of shelling lugs 39 were attached to the rotor 33 and that all of these projections were arranged in a helical pattern. Teeth 37 (¾'' long) and teeth 38 (1½'' long) were arranged in longitudinal rows such that together they defined a helix having a pitch of 4'', the longer teeth 38 being positioned 405° apart in the helical pattern such that by themselves they defined a helix which had a pitch eight times that of the former helix. This arrangement produces two different types of action and advances the material at differing rates. Large ears in the inside layer which become axially aligned by the cylindrical shell and rotor can be alternately caught between the shorter and longer teeth as it moves radially in and out. When the cob is up against the rotor, it will be caught by both sets of teeth and so be aligned axially. When the cob has moved radially outwardly enough to clear the shorter teeth, it will be picked up by the longer teeth alone and so positioned at approximately a 45° angle. This produces a wobbling effect which is very beneficial. In addition to this action, broken pieces of cob less than 4" long and ears of corn which became peripherally aligned originally will be advanced along the shorter pitched helix. In this position the teeth may rub along the side of the ear removing whole sections of kernels at a time. While the rotor tends to produce these motions, the cylindrical shell tends to align the ears in the outside layer longitudinally such that the ears in the inside layer tend to be slid lengthwise over the top of the outside layer. This is likewise very beneficial.

Teeth 37 perform several other functions. These teeth being only ¾" long are designed such that they do not extend to the center of an ear of corn. This feature helps the teeth tear off some of the husks and at the same time tends to roll the ears by pushing at a point adjacent to the outside of the ear.

Shell lugs 39 also perform several functions. These lugs are 3½" long and so project to within 1½" from the cylindrical shell and therefore extend into both layers of material. This is advantageous in keeping both layers under motion and is especially helpful during start-up. They also provide some additional husking and shelling action in the outside layer.

This machine is made to run at between 500 and 600 R. P. M. and at this speed the entire mass of cobs, husks, ears and kernels are under an appreciable centrifugal force. Under this force the kernels migrate to the outside of the mass and unless they are removed quickly, they collect between the ears. This accumulation of kernels is aggravated by the fact that the ears are held closely together in this machine and also by the fact that this machine has a capacity approximately three times that of prior art machines. In order to remove these kernels as rapidly as possible holes 24 are spaced throughout the entire circumferential extent of the screen cylinder and centrifugal force is utilized to remove the kernels on the top half of the screen. Experience has shown that these holes should be broadly between ½" and 1" in diameter, preferably ⅝" to ¾" in diameter, and more preferably ⅝" in diameter. In the present machine, these holes are placed on a 1 3/16" triangular pitch.

As stated above, the above-described shelling action is essentially completed in the first half of the machine. At this point the mass of the material is somewhat reduced and the husks tend to separate from the cobs. In other kernel separating machines, the loose husks lie against the shell in layers and prevent the kernels from reaching the screen. In my machine the husks and cobs travel completely around the cylinder and because of the large clearance between the screen and rotor are free to fall away from the screen at the top. This helps prevent tht build-up of husks on the screening surfaces. The shelling lugs also help in this respect in that they dig into the husks and cobs and keep the mass revolving. The material is advanced to the end of the machine by the helical pattern of teeth and lugs, and by the time it reaches the cob discharge door less than 1% of the kernels remain with the cobs and husks. The rate of discharge of the material is controlled by the cob discharge door 51 previously described. Stones are sometimes picked up in the harvesting operation, and when they are present they will pass out of the machine along with the cobs. Since these stones can damage the blades of the cob blower, it is necessary to separate them from the cobs before they reach the blower. This is done in my preferred arrangement by making the cobs, etc., drop downwardly out of the machine into a V-shaped chute. The sudden reversal of direction at the bottom of the V throws the stones to the bottom and allows them to roll out of the air adjustment door in the bottom of the V.

Having now described the action of the cobs in my corn sheller, a comparison can be made of its kernel removing action with that of previous corn shellers. Previous corn shellers have depended to a large degree upon the impingement of the ears upon metal surfaces. Since with this type of action the ears of corn must necessarily be thrown about between two or more metal surfaces, the impingement of these ears against the surfaces at times becomes quite severe and a substantial number of the kernels are broken. Also in this type of action there is considerable time in which each ear is either resting against or travelling between the kernel removing surfaces so that each ear experiences a considerable amount of free time in which no kernels are being removed. It is also true in these machines that each ear only experiences one point of contact at any one time (the point of impact) and this further limits the capacity of these machines.

The rubbing action between ears utilized in my invention has many advantages: (1) it is a more gentle type of action and greatly reduces the amount of kernel breakage; (2) the ears of corn surround one another so as to provide a plurality of kernel removing surfaces for each ear which at times can be as many as four or more; and (3) the rubbing action allows the contact between ears to be more or less continuous thereby contributing to the increase in capacity experienced by this machine.

Still other advances in the art can be seen in the tooth arrangement previously discussed above in the explanation of the operation of the machine.

Other modes of applying the principle of the invention may be employed, change being made as regards the details described, provided the features stated in any of the following claims or the equivalent of such be employed.

I therefore particularly point out and distinctly claim as my invention:

1. A corn sheller comprising in combination a substantially cylindrical shell having a substantially smooth inner surface and provided throughout substantially its entire circumferential and longitudinal extent with substantially circular radially extending openings of about ⅝" diameter and whose centers are spaced from ¾" to about 2" apart; a rotor supported for rotation coaxially within said shell, a set of teeth carried by said rotor extending radially outwardly for a distance such that their outer ends, upon rotation of said rotor, define circles of substantially uniform diameter which is from 4" to 8" less than the inside diameter of said perforate shell, said rotor being so constructed and arranged as to extend the major portion of the axial extent of said perforate shell and apart from said teeth upon rotation of said rotor to define a circle whose diameter is less than 9" smaller than the inside diameter of said perforate shell.

2. A corn sheller comprising in combination a substantially cylindrical shell having a substantially smooth inner surface and provided throughout substantially its entire circumferential and longitudinal extent with substantially circular radially extending openings of about ⅝" diameter and whose centers are spaced from ¾" to about 2" apart; a rotor supported for rotation coaxially within said shell; a first set of teeth carried by said rotor extending radially outwardly for a distance such that their outer ends, upon rotation of said rotor, define circles of substantially uniform diameter which is from 4" to 8" less than the inside diameter of said perforate shell; a second set of teeth carried by said rotor extending radially outwardly for a distance such that their outer ends, upon rotation of said rotor, define circles of substantially uniform diameter which is from 8" to 9" less than the inside diameter of said perforate shell; said rotor being so constructed and arranged as to extend the major portion of the axial extent of said perforate shell and apart from said teeth upon rotation of said rotor to define a circle whose diameter is less than 9" smaller than the inside diameter of said perforate shell.

3. A corn sheller comprising in combination a substantially cylindrical shell having a substantially smooth inner surface and provided throughout substantially its entire circumferential and longitudinal extent with substantially circular radially extending openings of about 5/8" diameter and whose centers are spaced from 3/4" to about 2" apart; a cylindrical rotor supported for rotation coaxially within said cylindrical shell, said rotor having a diameter at least 9" smaller than the inside diameter of the cylindrical shell, and having a length substantially coextensive with the length of said cylindrical shell; a set of teeth attached to said cylindrical rotor and extending radially outwardly from the surface of said cylindrical rotor for a distance such that their outer ends, upon rotation of said rotor, define circles of substantially uniform diameter which is from 4" to 8" less than the diameter of said perforate shell.

4. A corn sheller comprising in combination a substantially cylindrical shell having a substantially smooth inner surface and provided throughout substantially its entire circumferential and longitudinal extent with substantially circular radially extending openings of about 5/8" diameter and whose centers are spaced from 3/4" to about 2" apart; a cylindrical rotor supported for rotation coaxially within said cylindrical shell, said rotor having a diameter at least 9" smaller than the inside diameter of the cylindrical shell, and having a length substantially coextensive with the length of said cylindrical shell; a first set of teeth carried by said rotor extending radially outwardly for a distance such that their outer ends, upon rotation of said rotor, define circles of substantially uniform diameter which is from 4" to 8" less than the inside diameter of said perforate shell; a second set of teeth carried by said rotor extending radially outwardly for a distance such that their outer ends, upon rotation of said rotor, define circles of substantially uniform diameter which is from 8" to 9" less than the inside diameter of said perforate shell.

5. A corn sheller substantially as described in claim 1, characterized further in that the rotor contains a set of shelling lugs whose outer periphery, upon rotation of said rotor, defines circles of substantially uniform diameter which is from 1" to 4" less than the inside diameter of said perforate shell.

6. A corn sheller substantially as described in claim 2, characterized further in that the rotor contains a set of shelling lugs whose outer periphery, upon rotation of said rotor, define circles of substantially uniform diameter which is from 1" to 4" less than the inside diameter of said perforate shell.

7. A corn sheller substantially as described in claim 3, characterized further in that the rotor contains a set of shelling lugs whose outer periphery, upon rotation of said rotor, define circles of substantially uniform diameter which is from 1" to 4" less than the inside diameter of said perforate shell.

8. A corn sheller substantially as described in claim 4, characterized further in that the rotor contains a set of shelling lugs whose outer periphery, upon rotation of said rotor, define circles of substantially uniform diameter which is from 1" to 4" less than the inside diameter of said perforate shell.

9. A corn sheller substantially as described in claim 2, characterized further in that the first and second sets of teeth together define a first helix of a predetermined pitch and that the first set of teeth, when taken by themselves, define a second helix having a pitch which is greater than the pitch of the first helix by an amount which corresponds to the number of teeth contained in 360° of the first helix.

10. A corn sheller substantially as described in claim 4, characterized further in that the first and second sets of teeth together define a first helix of a predetermined pitch and that the first set of teeth, when taken by themselves, define a second helix having a pitch which is greater than the pitch of the first helix by an amount which corresponds to the number of teeth contained in 360° of the first helix.

11. A corn sheller substantially as described in claim 5, characterized further in that the first and second sets of teeth together define a first helix of a predetermined pitch and that the first set of teeth, when taken by themselves, define a second helix having a pitch which is greater than the pitch of the first helix by an amount which corresponds to the number of teeth contained in 360° of the first helix.

12. A corn sheller substantially as described in claim 6, characterized further in that the first and second sets of teeth together define a first helix of a predetermined pitch and that the first set of teeth, when taken by themselves, define a second helix having a pitch which is greater than the pitch of the first helix by an amount which corresponds to the number of teeth contained in 360° of the first helix.

13. A corn sheller comprising an outer cylindrical jacket having a smooth interior and shelled corn discharge perforations throughout its entire circumferential and longitudinal extent, a rotor mounted coaxially within and in spaced relation to said jacket, radially extending helically spaced teeth on said rotor having a maximum projection therefrom of approximately three-fifths of the radial spacing between the rotor and the outer jacket, such radial spacing being approximately equal to the thickness of two ears of corn.

14. A corn sheller as set forth in claim 13, characterized further in that said outer jacket has an end wall provided with an opening for discharge of cobs and husks, and a cob blower operative to draw out and remove the cobs and husks connected to the jacket at such opening.

15. A corn sheller as set forth in claim 14 characterized further in that said cob blower is connected to such discharge opening by a chute including a downwardly directed angular portion providing a sharp reversal in the flow in the material between the opening and the blower.

16. A corn sheller comprising a substantially horizontal outer cylinder provided with shelled corn discharge perforations throughout its entire circumferential and longitudinal extent, said outer cylinder having end walls and a smooth inner surface, an inner cylinder mounted for rotation coaxially within and in spaced relation to said outer cylinder, radially extending helically spaced teeth on said inner cylinder having a maximum projection therefrom of approximately three-fifths of the radial spacing between such inner and outer cylinders, such radial spacing being approximately equal to the thickness of two ears of corn, a cob discharge opening in the lower portion of the wall of such outer cylinder at the discharge end of the same, and an external closure for such opening hingedly connected to such end wall for upward swinging movement.

17. A corn sheller as set forth in claim 16 characterized further in that a cob blower is connected by chute means to said discharge opening to draw out and remove the cobs and husks through the same, said chute means extending downwardly from the opening and then upwardly to the intake of said blower.

18. A corn sheller comprising a substantially horizontal outer cylinder provided with shelled corn discharge perforations throughout its entire circumferential and longitudinal extent, said outer cylinder having intake and discharge openings at its respective ends and a smooth inner surface therebetween for slippage of material moved along such surface from one opening to the other, an inner cylinder mounted for rotation coaxially within said outer cylinder, the outer diameter of said inner cylinder being about ten inches less than the inside diameter of the outer cylinder so that the clearance between the two is about twice the diameter of an average ear of corn, whereby the annular space thus defined between the two cylinders accommodates inner and outer layers of axially extending ears of corn, a series of radially outwardly extending teeth carried by said inner cylinder, said teeth being arranged helically about the periphery thereof and having a maximum projection therefrom of about three inches, the teeth in their maximum extent thereby extending only a short distance into such an outer layer of ears of corn, and drive means operative to rotate said inner cylinder at a speed which causes corn shelled from the ears to be expelled through the perforations of said outer cylinder over the entire circumference of the same by centrifugal force.

References Cited in the file of this patent

UNITED STATES PATENTS

| | | |
|---|---|---|
| 2,271,897 | Mast | Feb. 3, 1942 |
| 2,271,898 | Mast | Feb. 3, 1942 |
| 2,626,611 | Nixon | Jan. 27, 1953 |
| 2,678,652 | Bryant, Jr. | May 18, 1954 |